Figure 1:
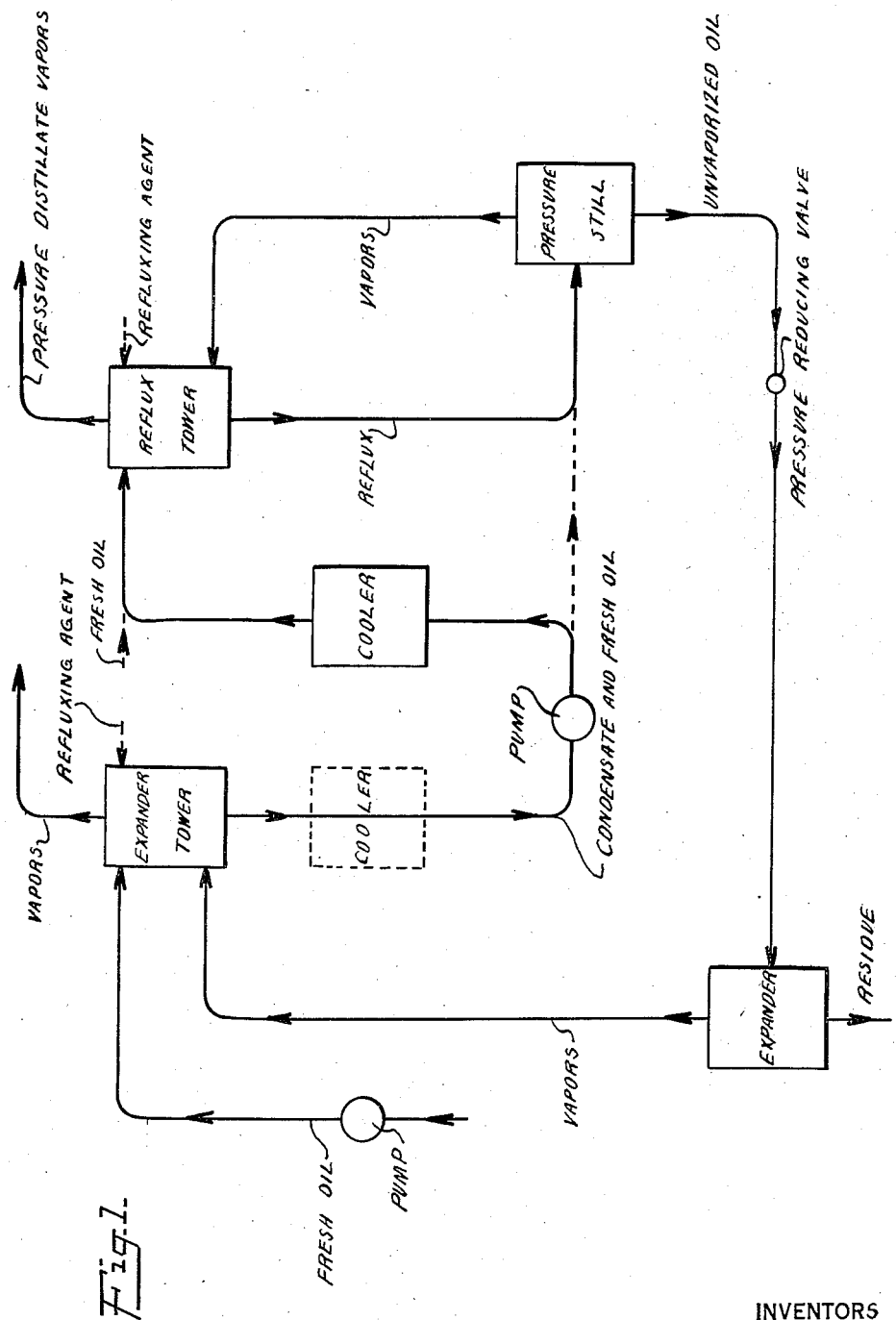

Patented Aug. 19, 1930

1,773,181

UNITED STATES PATENT OFFICE

EUGENE C. HERTHEL AND THOMAS DE COLON TIFFT, OF CHICAGO, ILLINOIS, ASSIGNORS TO SINCLAIR REFINING COMPANY, OF NEW YORK, N. Y., A CORPORATION OF MAINE

ART OF CRACKING HYDROCARBON OILS

Application filed June 7, 1928. Serial No. 283,514.

This invention relates to improvements in the cracking of higher boiling hydrocarbon oils, such as gas oil, to produce therefrom lower boiling hydrocarbon oils, such as gasoline. This application is in part a continuation of an application filed June 22, 1926, Serial No. 117,697 which has matured into Patent 1,677,773.

This invention relates particularly to impovements in operations in which hydrocarbon oils are cracked by distillation under pressure and in which residual oil withdrawn undistilled from the pressure distillation is expanded at a lower pressure for the further separation of oil constituents as vapors therefrom. The invention has several important advantages in heat economies, in features of control, in simplicity of operation, and in the maintenance of conditions which permit prolongation of the useful period of operation without sacrifice of efficiency.

In carrying out the present invention, the oil to be cracked is subjected to distillation under pressure at a cracking temperature in a pressure still, the vapors driven off from the still are subjected to a refluxing operation in a reflux tower from which reflux is returned to the still, and the vapors remaining uncondensed from the refluxing operation are condensed to form the distillate product. The operation is carried out in a continuous manner by supplying fresh oil to the pressure still charge and withdrawing unvaporized oil containing pitch formed by cracking during the operation. The pitch laden oil withdrawn from the still charge is expanded by reducing the pressure thereon and is thereby separated into an unvaporized residue and an oil fraction driven off as vapors. The pitch content of the unvaporized oil withdrawn from the pressure still charge is separated in this residue and the oil components of the withdrawn material, or the greater part of them, are separated as vapors, this separation advantageously being effected simply by the heat contained in the pitch laden oil from the pressure still.

In accordance with the present invention, the oil vapors separated from the pitch laden oil withdrawn from the pressure still are passed through a tower through which the fresh oil, or part of the fresh oil, to be supplied to the pressure still is passed in direct contact with these vapors. This fresh oil is thus heated and the vapors are thus cooled. The heavier components of the vapors are condensed and together with the unvaporized components of the fresh oil form a mixture, all or part of which is then introduced into direct contact with the vapors in the refluxing operation to which the vapors driven off from the pressure still are subjected after being partially cooled. Part of this oil mixture may be supplied directly to the pressure still. Any such part of the oil mixture is advantageously supplied directly to the pressure still without being cooled. Additional fresh oil may also be introduced into direct contact with the vapors in the refluxing operation to which the vapors driven off from the pressure still are subjected. In the tower through which the vapors separated from the unvaporized oil withdrawn from the pressure still are passed, lighter constituents such as those suitable as components of the distilled product remain uncondensed and, together with any similar constituents contained in the fresh oil supplied to this tower, are withdrawn and separately condensed.

The operation of the tower through which the vapors driven off from the pressure still are passed is advantageously controlled, to maintain the escaping vapors at the desired temperature and to control the refluxing operation, by regulating the cooling of the oil mixture supplied from the other tower, by regulating the proportion of cool fresh oil introduced with this oil mixture, or by regulating the proportion of this oil mixture diverted directly to the pressure still. Some supplemental cooling or refluxing agent may also be used. A part of the condensed pressure distillate or some similar light fraction, for example, may be introduced into the reflux tower on the pressure still, best at a point above the point of introduction of the oil mixture from the other tower, as a supplemental cooling or refluxing agent. The operation of the tower through which the vapors separated from the unvaporized oil withdrawn from the pressure still are passed is advantageously controlled by regulating the rate at which fresh oil is supplied so that the vapors escaping uncondensed therefrom correspond in character to the pressure distillate escaping as vapors from the reflux tower on the pressure still. These vapors may then be condensed and collected as part of the desired distillate product. If the amount of fresh oil required to be supplied to the pressure still operation is not sufficient to effect the necessary condensation, some supplemental cooling or refluxing agent may be employed. A part of the condensed distillate, or some similar light fraction, for example, may be introduced into this tower, best at a point above the point of introduction of the fresh oil. When such light oil fractions are introduced into either tower as supplemental cooling or refluxing media, they are substantially completely revaporized, escaping with the uncondensed vapors to be condensed therewith.

Fig. 1 of the accompanying drawings is a picturial representation of the operation of the process of the invention. The invention will be further described in connection with Fig. 2 of the drawings which illustrates in a diagrammatic and conventional manner an apparatus adapted for carrying out the process of the invention.

Figure 2:
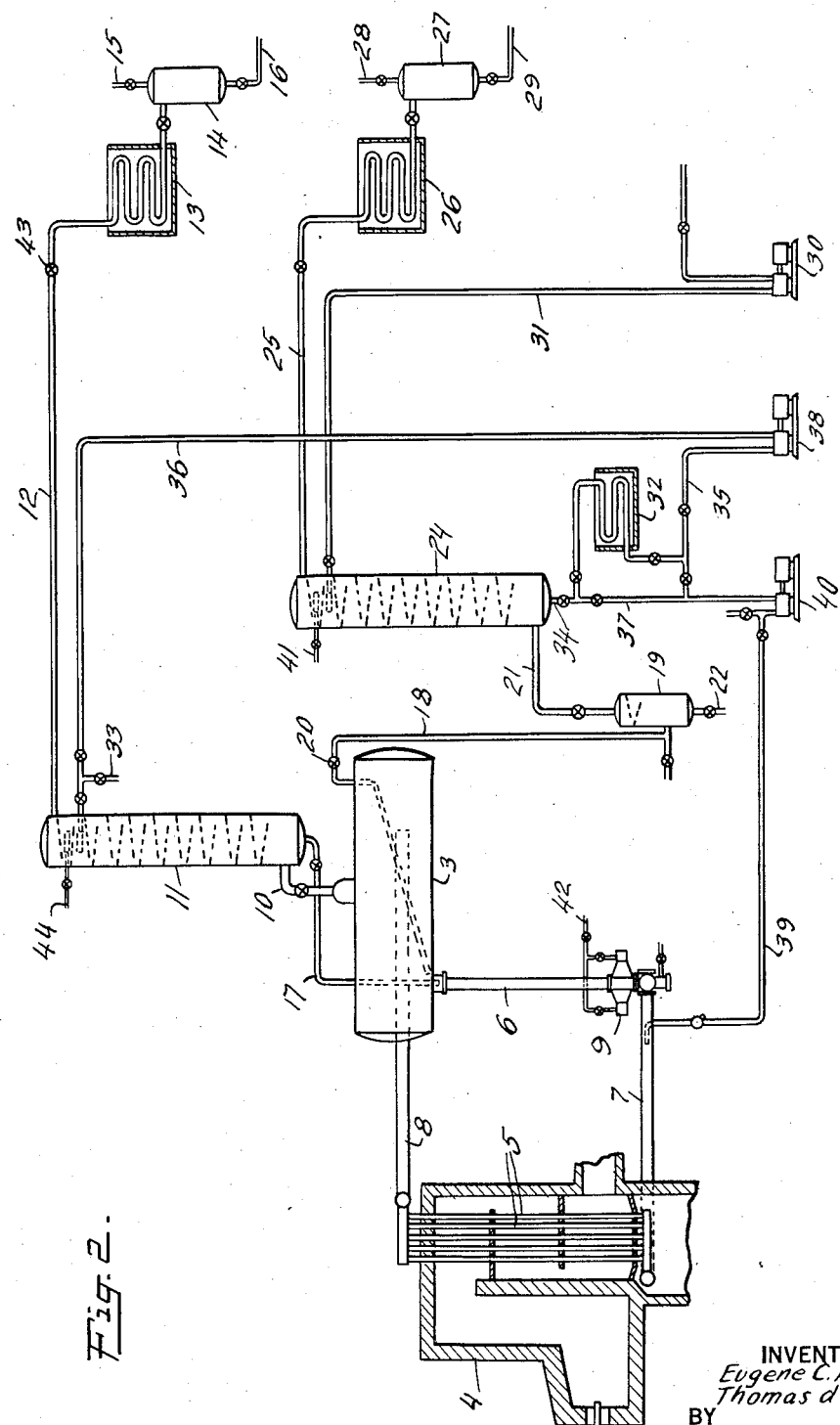

Referring to Fig. 2 of the drawings, the pressure still illustrated comprises a bulk supply tank 3 located away from the heating furnace 4, a battery of vertical heating tubes 5 arranged in the heating furnace, and circulating connections 6, 7 and 8, and a circulating pump 9 arranged to withdraw oil from the bulk supply tank and force it upwardly through the heating tubes and back to the bulk supply tank. Vapors from the bulk supply tank escape through connection 10 and pass upwardly through the reflux tower 11, uncondensed vapors escaping from the upper end of the reflux tower through connection 12 to the condenser 13 in which they are condensed, the condensate collecting in receiver 14. A connection 15 is provided for the discharge of uncondensed vapors and gases and a connection 16 for the discharge of the condensate. Reflux, and any admixed unvaporized oil introduced into reflux tower 11, are returned to the circulating line connecting the bulk supply tank with the suction side of the circulating pump through connection 17. Unvaporized oil is withdrawn from the bulk supply tank 3 through connection 18 arranged to discharge into expander 19. A pressure reducing valve 20 is provided in connection 18 advantageously at a point adjacent the pressure still, to control and reduce the pressure between the bulk supply tank and the expander. To promote vaporization, steam, or other hot gaseous medium, may be introduced into the expander 19, for example, steam may be injected into and admixed with the oil as it enters the expander. As little as one percent of steam will, in many cases, materially increase the amount of vaporization over any particular pressure drop. To inhibit entrainment several baffles are arranged in the upper end of the expander 19. Vapors escape from the expander through connection 21 and unvaporized material is discharged through connection 22. The vapors from the expander pass upwardly through expander reflux tower 24, uncondensed vapors escaping from the upper end of this tower through connection 25 to condenser 26 in which they are condensed, the condensate collecting in receiver 27 which is provided with a discharge connection 28 for uncondensed vapors and gases and connection 29 for the discharge of condensate. Fresh oil is supplied by means of pump 30 to the upper end of the expander tower 24 through connection 31. Fresh oil may also be supplied to the upper end of the reflux tower 11 through connection 33. The condensate and admixed fresh oil collecting in the lower end of expander tower 24 is withdrawn through connection 34. This mixture, or part of this mixture, is introduced into the upper end of the reflux tower 11 through connection 34, cooler 32, and connections 35 and 36 by means of pump 38. Part of this oil mixture introduced into the upper end of the reflux tower 11 through connection 35 and 36 may be by-passed around cooler 32 through connection 37. Part of this oil mixture may also be supplied directly to the pressure still through connections 34 and 39 by means of pump 40, either hot as discharged from the lower end of the expander tower 24 or after passing through the cooler 32. As a supplemental refluxing or condensing agent or controlling medium, a part of the distillate product can be introduced either into the upper end of the reflux tower 11 through connection 44 or into the upper end of the expander tower 24 through connection 41. The hot parts of the apparatus, as well as the hot connections, are advantageously lagged or heat insulated to prevent heat loss. The expander tower 24 may be left uninsulated although control is somewhat facilitated if this tower is also insulated against heat loss. Cool oil for cooling and lubricating the bearings of the circulating pump 9 may be supplied through connection 42; fresh oil in excess of that required to cool and lubricate the pump bearings may also be supplied to the pressure still charge by this means.

In operation the pressure still is charged with fresh oil and brought to cracking conditions of temperature and pressure. In a still of the type illustrated, an initial charge of about 8000 gallons of cooled oil that is, oil at a temperature of about 80° F., for example, is commonly employed. The pressure maintained during the operation is determined to a large measure by the stocks to be treated and the products to be obtained. With gas oil character charging stocks, pressures up to 125 lbs. per square inch or more may be used and with charging stocks containing large amounts of kerosene character components, much higher pressure, say up to 300 lbs. per square inch, or more, may be used. When the still is brought to operating conditions, fresh oil is initially introduced through connection 33 and pressure distillate vapors are discharged into the condenser and condensed, the pressure being regulated by valve 43 between the reflux tower and the condenser. The pressure may also be regulated, if desired, by valves beyond the condenser. During the initial period of operation, unvaporized oil is not withdrawn from the pressure still or is withdrawn in but small amount, but before the pitch concentration in the charge of oil in the pressure still reaches an objectionable value, the withdrawal of pitch laden oil in substantial amount is begun. The pitch laden oil withdrawn is discharged into the expander 19 where a pressure substantially lower than that prevailing within the pressure still is maintained, the pressure between the still and the expander being reduced by means of valve 20. Due to this reduction in pressure, the withdrawn pitch laden oil is subjected to further vaporization, the vapors entering the expander tower and pitch components separating in a residue remaining unvaporized. The degree of vaporization in the expander can be controlled by regulating the pressure therein. As much as 80% or more of the pitch laden oil may be so vaporized by its self-contained heat, but if liquid residue is to be obtained, it is usually not desirable to go much beyond this point and it may be necessary to reduce the amount of vaporization although a liquid residue can sometimes be obtained with vaporization of as much as 90% of the pitch laden oil. Or, if desired, the expander can be run to separate a coke or cokey residue in which event a series of expanders becomes necessary so that the operation can be carried out continuously. With still pressures in the neighborhood of 100 lbs. per square inch or more, the pressure in the expander may be maintained at a value between atmospheric pressure and say 50 lbs. per square inch or more, depending upon the amount of vaporization desired. When the withdrawal of pitch laden oil is begun and vapors from this oil begin to pass through the expander tower, fresh oil is introduced into the top of the expander tower 24 through connection 31 and the oil introduced into the top of the reflux tower 11 is supplied through connection 36 from the oil mixture withdrawn from the lower end of the expander tower 24 after cooling. Operating for the production of gasoline or gasoline containing pressure distillate with a gas oil character charging stock, as an example of the operation of the invention, the temperature at the top of the reflux tower 11 may be maintained at about 550° F. and the temperature at the top of the expander tower 24 at about 350° F. The pressure distillate may be taken off at a rate, for example, of about 1000 gallons per hour, and pitch laden unvaporized oil withdrawn from the still charge at a rate of about 1500 gallons per hour, requiring the return to the pressure still of 2500 gallons of oil per hour to maintain the charge. The temperature of the oil as withdrawn from the pressure still during operation under pressure in the neighborhood of 100–125 lbs. per square inch may approximate 700–725° F., and on reduction to approximately atmospheric pressure up to about 80% or 1200 gallons per hour of this oil may be vaporized, the temperature of the vapors and of the residue escaping from the expander approximating 650° F. or upwards. Since part of this vaporized fraction of the oil withdrawn from the still charge escapes as vapors from the expander tower, fresh oil in amount upwards of 1300 gallons per hour is supplied. The temperature of the mixture collecting in the bottom of the expander tower 24 may approximate 480° F. and that part of this mixture introduced into the reflux tower 11 is cooled, for example, to 275–280° F. The supply of oil to the reflux tower 11 is regulated to maintain the desired head temperature and any oil necessary to be supplied to the still charge in excess of that introduced into the reflux tower 11 may be supplied to the still charge directly. Any oil so supplied directly to the still charge is advantageously supplied at as high a temperature as is available. To maintain the desired head temperatures, part of the distillate product may be supplied to the upper ends of the reflux tower and the expander tower as required.

It will thus be seen that this invention provides an improved method of carrying out pressure distillation processes for cracking hydrocarbon oils which effects several economies without involving complex operations. The separation of unvaporized oil withdrawn from the pressure distillation into a residue containing all the pitch constituents of the withdrawn oil and a completely vaporized fraction is effected without requiring additional heat and a part of the heat of the fraction so vaporized is returned to the pressure distillation in a particularly advantageous way. This heat is absorbed in part in fresh oil which is brought in contact with the vapors forming this separated fraction and is returned to the pressure still in the condensate produced from these vapors and in the heated fresh oil. Part of this heat is given off in cooling of the mixture of fresh oil and condensate, but nevertheless some of it is returned and made usefully available in the cracking operation whereas otherwise it would be lost for this purpose. Heat so returned to the pressure distillation assists in prolonging the period over which the operation can be continued as it reduces to a corresponding extent the amount of heat necessary to be transferred through the walls of the pressure still in which the operation is carried out, making possible lower furnace temperatures to effect any given conversion of a particular stock. Such lower furnace temperatures can be maintained conveniently by recycling part of the hot gases again over the heat transferring walls. With the withdrawal of substantial amounts of pitch laden oils from the pressure distillation, the economy thus effected becomes particularly important. Likewise, in carrying out the invention, lighter constituents present in the oil withdrawn from the pressure distillation, which if returned might be subjected to over-cracking, are separated before the condensate reduced from the vapors separated from this oil under reduced pressure is returned to the pressure distillation and may be combined with the distillate product, and similarly lighter constituents present in the fresh oil supplied to the operation can be separated in a particularly advantageous way. If stocks containing such lighter constituents are supplied directly to the pressure still or to a reflux tower on the pressure still, heat is absorbed in the still resulting in the vaporization of such components and frequently in over-cracking of such components, which otherwise would be available for useful cracking. In this respect also, the invention makes it possible to reduce the amount of heat necessary to be transferred through the walls of the pressure still to effect any given conversion of a particular stock of this type or conversely to increase the capacity of the pressure still. The invention has another advantage in that the apparatus for cooling the components of the pitch laden oil in accordance with the invention can be made compact and of a type easily maintained; a tower with direct heat exchange between vapors from the pitch laden oil and fresh charging stock or other condensing agent can be made less cumbersome and can be kept in operation more easily than water cooled condensers of conventional construction of adequate size to condense the vapors resulting from expansion of the oil or than coolers of conventional construction to bring the withdrawn oil to a sufficiently low temperature to handle without vaporization.

We claim:—

In processes of cracking higher boiling hydrocarbon oils to produce lower boiling hydrocarbon oils by distillation under pressure at cracking temperatures in which unvaporized oil is withdrawn during the pressure distillation and subjected to further vaporization by its self-contained heat under a reduced pressure, the improvement which comprises passing the vapors separated from the oil withdrawn from the pressure distillation into a tower, introducing fresh oil into direct contact with the vapors in this tower and thereby subjecting the vapors to condensation, passing the vapors from the pressure still into a reflux tower, cooling admixed condensate and unvaporized fresh oil from the first tower and introducing the cooled mixture into direct contact with the vapors in the second mentioned tower, and returning reflux together with admixed unvaporized oil from the second mentioned tower to the pressure distillation.

In testimony whereof we affix our signatures.

EUGENE C. HERTHEL.
THOMAS DE COLON TIFFT.